Sept. 12, 1950     W. D. McPARTLIN     2,521,930

TRIG-METER

Filed Sept. 10, 1945                              2 Sheets-Sheet 1

*INVENTOR.*
WILLIAM D. McPARTLIN

BY
Whittemore Hulbert & Belknap

ATTORNEYS

Sept. 12, 1950 W. D. McPARTLIN 2,521,930
TRIG-METER

Filed Sept. 10, 1945 2 Sheets-Sheet 2

INVENTOR.
WILLIAM D. McPARTLIN
BY
Whittemore Hulbert + Belknap
ATTORNEYS

Patented Sept. 12, 1950

2,521,930

UNITED STATES PATENT OFFICE 2,521,930

TRIG-METER

William D. McPartlin, Detroit, Mich.

Application September 10, 1945, Serial No. 615,308

4 Claims. (Cl. 35—30)

The invention relates to mechanical devices which are useful in the teaching of mathematics and more particularly to the teaching of trigonometry.

It is the object of the invention to obtain a construction which will assist the student in the understanding of natural trigonometric functions of angles, sine, cosine, tangent, cotangent, secant and cosecant; also, their values and abbreviations. To this end the invention consists in the construction as hereinafter set forth.

Figure 1:
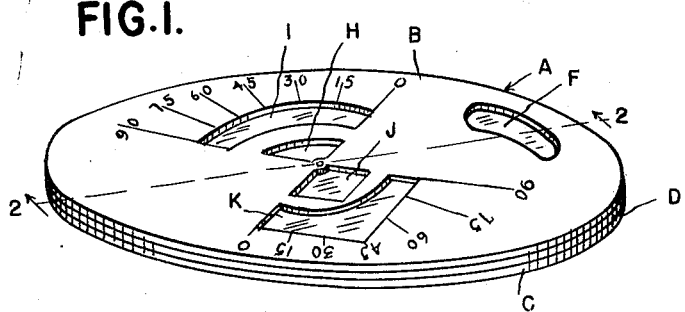
Fig. 1 is a perspective view of the "trig-meter;"

In the teaching of mathematics and particularly in geometry and trigonometry, certain students have great difficulty in visualizing the subject matter. Thus, in trigonometry the various functions must be visualized and understood before the student can proceed further in the study. To assist in this work I have constructed a mechanical device which may be termed a "trig-meter" and which is of the following construction. A is a flat outer casing including registering top and bottom plates B and C separated from each other by an annular spacer D adjacent to the periphery thereof. E is a circular disc located in the space between the plates B and C and guided for rotation about its center preferably by the spacer D. Both top and bottom plates are preferably provided with registering cut-outs F and G through which the thumb and finger may be respectively inserted to rotate the disc.

The top plate B has additional cut-outs comprising a quadrant H of unit radius such, for instance, as 1", an outer concentric quadrant I having the radius of its outer edge twice that of the unit dimension; also, a square cut-out J forming an adjacent vertical angle to the quadrant H and with its sides of unit dimension and an enlarged cut-out K forming two sides of a square of twice the unit dimension. The bottom plate C has an oblong rectangular cut-out L which registers with the solid quadrant of the top plate between the cut-outs H and J. The short side of the cut-out L is of unit dimension and the long side of more than twice such dimension. Both top and bottom plates are provided with angular markings preferably with an included angle of 15° therebetween being marked, respectively, in an anticlockwise direction, 0, 15, 30, 45, 60, 75 and 90. Similar markings are placed for both vertically adjacent quadrants. On the bottom side C angular markings from zero to 90 are placed in the quadrant containing the cut-out L.

The disc E has markings on one side thereof including lines $a$ and $b$ extending perpendicular to each other through the center to divide the area into quadrants. In the first quadrant (according to trigonometry) it has an additional line $c$ forming in connection with the line $a$ an angle of 45° and in connection with line $b$, a complementary angle of 45°. In the second quadrant line $d$ forms in connection with the line $b$ an angle of 60° and with line $a$ an angle of 30°. In the third quadrant the line $e$ forms in connection with the line $a$ an angle of 75° and in connection with the line $b$, a complementary angle of 15°. In the fourth quadrant the line $f$ forms in connection with the line $a$ an angle of 60° and in connection with the line $b$, angle of 30°. There are also two circles $g$ and $h$, the radius of the first being of unit dimension and, of the second, twice the unit dimension. In addition, there are lines perpendicular to the lines $a$ and $b$ which represent the cosine and tangent of each of the angles with respect to each of the circles.

The opposite face of the disc E has lines $i$ and $j$ dividing it into quadrants and a circle $k$ of unit radius. There are also lines for the several angles but differently placed in the quadrants. Thus the angle of 15° is in the first quadrant, the angle of 45° is in the third quadrant and the angles of 30° and 60° in the second and fourth quadrants. However, the first and fourth quadrants of the upper face register respectively with the second and third quadrants of the lower face.

By the use of the device above described, the student will readily understand the fundamentals of the subject of trigonometry. It is well known that the functions of angles are calculated from a group of three triangles drawn in conjunction with a circle whose radius is one. Radius=1 is the expression used. The trig-meter is made with a definite 1" radius and the student is taught the functions for inches. With this method the student can measure the length of the various functions approximately and compare them with the values given in the tables of functions. It is not necessary for the student to do any drawing until he understands the functions. Teaching with the trig-meter the instructor would show the student a triangle in the 1" radius, explaining that it is the first triangle of the group and the sides of this triangle are the angle, sine and cosine, which are shown clearly on the trig-meter. The student will see that the angle of the triangle must line up with the corresponding angle mark on the radius or the triangle will not fit properly in the radius.

The same triangle is next shown in the square cut-out and the tangent of the angle comes into view. The student will see that the tangent of the angle is outside the 1" radius and in a 1" square, that is for angles to 45°. Also, that the angles of the triangle must line up with corresponding angle marks on the square. The first and second triangles of the group are shown in this square. The sides of the second triangle are the angle or secant, tangent and base or length of radius which is 1".

Looking at the reverse side without moving the disc the cotangent of the same angle is shown; also, the whole group of three triangles. The student will see that the sides of the third triangle are the angle or cosecant, cotangent and one side of the 1" cut-out.

The student is next shown the notations for the secant and cosecant and is then able to study the triangles and functions as a group. The values and abbreviations of the functions are also shown on reverse side. The 2" radius and 2" square are used to explain the law of triangles, that when the length of the radius is changed the other two sides of the triangle are changed a proportionate amount.

Figure 2:
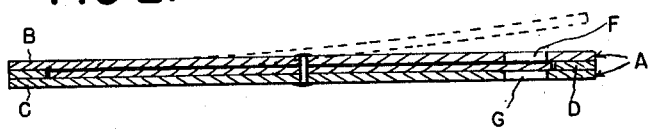
Fig. 2 is a cross section of line 2—2, Fig. 1.
Figure 3:
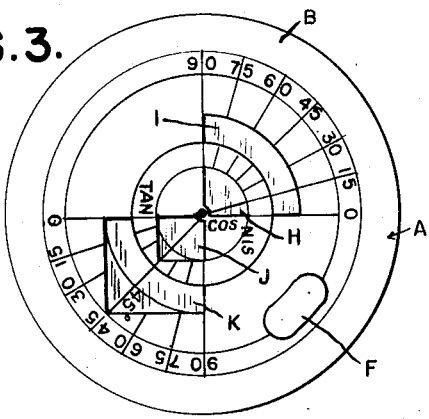
Fig. 3 is a top plan view.
Figure 4:
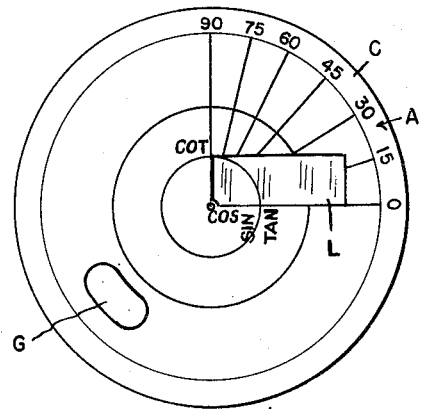
Fig. 4 is a bottom plan view.
Figure 5:
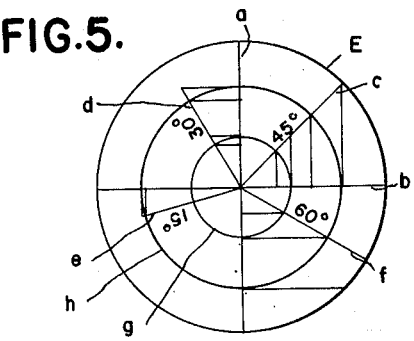
Fig. 5 is a top plan view of the revoluble disc removed from the casing.

For further explanation it may be desirable to use exchangeable discs having different markings thereon. This is accomplished by either removing the top plate A or, if this is formed of flexible material, it may be bent up from one side as illustrated in dotted lines, Fig. 2, which provides space for removing the one disc and inserting a substitute.

Figure 6:
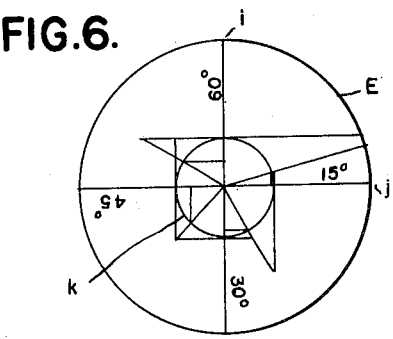
Fig. 6 is a bottom plan view thereof.
Figure 7:
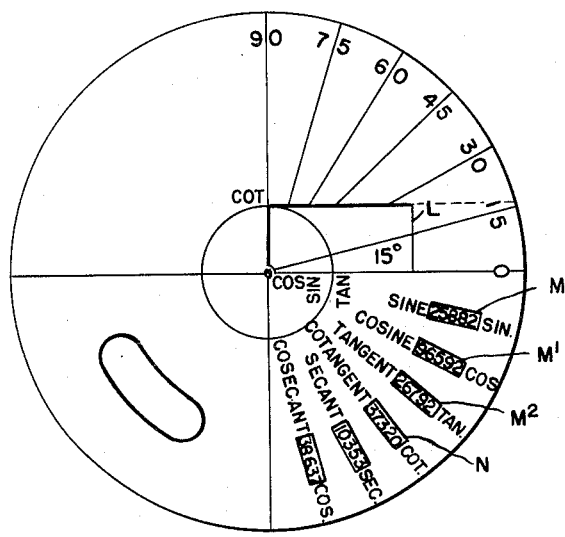
Fig. 7 is a view similar to Fig. 4 showing a modified construction.
Figure 8:
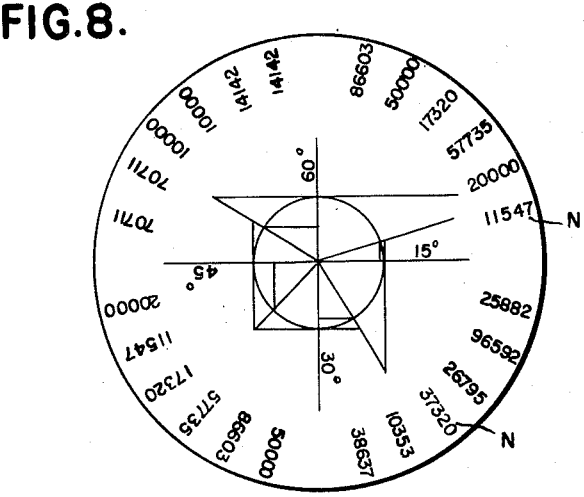
Fig. 8 is a bottom plan view of the modified form of disc.

The modified construction shown in Figs. 7 and 8 can, if desired, be added to the construction previously described. It includes additional features which would be useful to the student in understanding trigonometry. In particular, it provides a means for quickly ascertaining the values in different triangles of the sine, cosine, tangent, etc. Thus, as shown in Fig. 7, there is arranged in the fourth quadrant (according to trigonometry) a series of windows M, M', M², etc. respectively for the sine, cosine, tangent, cotangent, secant, and cosecant, these terms being placed opposite their respective windows on the radially inward side thereof. On the outer side of these same windows are the customary abbreviations for these terms, such as sin. for sine, cos. for cosine, etc. On the disc shown in Fig. 8 there is the same diagram as shown in Fig. 6 previously described including different triangles in different quadrants. In addition there is arranged around the periphery a series of numbers N which are arranged to register with the windows M, M', etc. The values of the numbers in each quadrant are for the triangle shown in the adjacent quadrant in the anticlockwise direction. Consequently, when any one of the triangles in the four quadrants is displayed through the cut-out L with one side of the triangle in line with the bottom of the cut-out, the correct values will be displayed through the windows M, M', etc. As a specific instance as shown in Fig. 7, a 15° triangle is displayed in the cut-out L and the window M displays the number .25882 which is the value of the sine. In like manner the value of the cosine is displayed through the window M' and is .96592. If a different triangle is displayed in the cut-out L, the correct values for such triangle are displayed through the windows M, M', etc. Thus, the student becomes familiar with the terms, the abbreviations therefor and the values for certain standard triangles.

What I claim as my invention is:

1. A device facilitating the study of trigonometry comprising a disc having a trigonometric diagram thereon concentric with its axis and including a circle of predetermined radius, a cover plate for said disc having cut-outs in vertically opposite quadrants thereof with respect to the axis of said disc, the cut-out in one of said quadrants having an arcuate outer contour of a radius corresponding to that of said circle and the cut-out in the opposite quadrant being square with the sides thereof equal to said radius and one corner registering with the center of said circle, and means for revolubly adjusting said disc to exhibit portions of said diagram alternatively through said cut-outs.

2. A device facilitating the study of trigonometry comprising a disc having a trigonometric diagram thereon concentric with its axis and including a circle of a predetermined radius and a second circle of twice said radius, a cover plate having cut-outs in vertically opposite quadrants thereof with respect to the axis of said disc, the cut-out in one of said quadrants having a portion with an outer arcuate contour of a radius corresponding to that of the small circle of said diagram and another portion having an outer arcuate contour of a radius corresponding to that of the large circle of said diagram, and the cut-out in the opposite quadrant having a square portion, the sides of which correspond to the radius of the small circle and an outer square portion the sides of which correspond to the radius of the large circle with one corner registering with the center thereof, and means for revolubly adjusting said disc with respect to said cover plate to exhibit portions of said diagram alternatively through the cut-outs of the opposite quadrant.

3. A device for facilitating the study of trigonometry comprising a flat casing having spaced top and bottom plates forming a circular chamber therebetween, cut-outs in one of said plates in vertically opposite quadrants thereof with respect to the axis of said circular chamber, the cut-out in one of said quadrants having an arcuate outer contour of a predetermined radius and the other of said cut-outs being square with the sides thereof equal to said radius and one corner registering with the center of said circle, and a revoluble disc within said circular chamber, said disc having thereon a trigonometric diagram based on a circle of said predetermined radius, whereby the rotative adjustment of the disc within said chamber will exhibit portions of said diagram alternatively through said opposite cut-outs.

4. A device facilitating the study of trigonometry comprising a flat casing having spaced top and bottom plates forming a circular chamber therebetween, cut-outs in vertically opposite quadrants of said top plate with respect to the axis of said chamber, the cut-out in one quadrant having an arcuate outer contour of a predetermined radius and the cut-out in the opposite quadrant being square with the sides thereof equal to said radius with one corner registering with the center of the circle, said bottom plate having a cut-out registering with the quadrant between the cut-outs of said top plate, said bottom plate cut-out being of oblong rectangular form with a corner thereof registering with the center of the circle and the short side equal to said radius, and a disc revoluble within said chamber both faces of said disc having trigonometric diagrams thereon including circles of said predetermined radius and with a diagram on one side in predetermined relation to that on the other side whereby said disc may be rotatively adjusted within said chamber to exhibit portions of said diagram through the cut-outs in said top plate and to also exhibit when said disc is stationary a portion of the diagram through the cut-out in said lower plate having a predetermined relation to the exhibit portions through the cut-outs in said top plate.

WILLIAM D. McPARTLIN.

REFERENCES CITED

The following references are of record in the file of this patent:

UNITED STATES PATENTS

| Number | Name | Date |
|---|---|---|
| 647,339 | Thompson | Apr. 10, 1900 |
| 1,343,112 | Charrier | June 8, 1920 |
| 1,429,463 | Squyer | Sept. 19, 1922 |
| 1,536,693 | Schneider | May 5, 1925 |
| 1,841,912 | Pierce | Jan. 19, 1932 |
| 1,955,392 | Shimberg | Apr. 17, 1934 |
| 2,166,372 | Roeder | July 18, 1939 |
| 2,234,896 | De Turk | Mar. 11, 1941 |
| 2,385,732 | Redding | Sept. 25, 1945 |

OTHER REFERENCES

Webster's 1939 Unabridged Dictionary, page 2711.